United States Patent
Yu

(10) Patent No.: US 11,106,872 B2
(45) Date of Patent: Aug. 31, 2021

(54) SYSTEM AND METHOD FOR IMPROVING SENTENCE DIAGRAM CONSTRUCTION AND ANALYSIS BY ENABLING A USER POSITIONING SENTENCE CONSTRUCTION COMPONENTS AND WORDS ON A DIAGRAMMING INTERFACE

(71) Applicant: Jyu-fang Yu, Austin, TX (US)

(72) Inventor: Jyu-fang Yu, Austin, TX (US)

(*) Notice: Subject to any disclaimer, the term of this patent is extended or adjusted under 35 U.S.C. 154(b) by 248 days.

(21) Appl. No.: 16/242,242

(22) Filed: Jan. 8, 2019

(65) Prior Publication Data

US 2019/0213257 A1     Jul. 11, 2019

Related U.S. Application Data

(63) Continuation of application No. 62/615,175, filed on Jan. 9, 2018.

(51) Int. Cl.
| | |
|---|---|
| *G06F 40/289* | (2020.01) |
| *G06F 17/16* | (2006.01) |
| *G06F 16/332* | (2019.01) |
| *G06F 40/30* | (2020.01) |
| *G06F 40/211* | (2020.01) |
| *G06F 40/253* | (2020.01) |

(52) U.S. Cl.
CPC ............ *G06F 40/30* (2020.01); *G06F 40/211* (2020.01); *G06F 40/253* (2020.01)

(58) Field of Classification Search
CPC ..... G06F 40/289; G06F 17/16; G06F 16/3322

USPC .............................................................. 707/5
See application file for complete search history.

(56) References Cited

U.S. PATENT DOCUMENTS

| | | | |
|---|---|---|---|
| 2004/0122816 A1* | 6/2004 | Kirkland | G06F 16/3322 |
| 2017/0091170 A1* | 3/2017 | Cardillo | G06F 40/289 |
| 2020/0081909 A1* | 3/2020 | Li | G06F 17/16 |

* cited by examiner

*Primary Examiner* — Farzad Kazeminezhad
(74) *Attorney, Agent, or Firm* — Boyle Fredrickson, S.C.

(57) ABSTRACT

A computer-implemented system for improving computerized analysis and grading for one or more populated sentence structure diagrams is shown. The system includes a sentence diagramming interface which in turn includes a natural language input for receiving a natural language sentence to be diagrammed, a sentence construction toolbox including a plurality of sentence construction components used in generating a constructed sentence structure, and a sentence construction workspace configured to receive and allow manipulation of at least one selected sentence construction component to generate the constructed sentence structure and receive and allow manipulation of each word in the natural language sentence such that each word is assigned to a position in the constructed sentence structure to generate a constructed and populated sentence structure. The system further includes sentence analysis logic implemented on a server computer for comparing the constructed and populated sentence structure to an analysis sentence structure to assign a grading point value to the constructed and populated sentence structure.

15 Claims, 14 Drawing Sheets

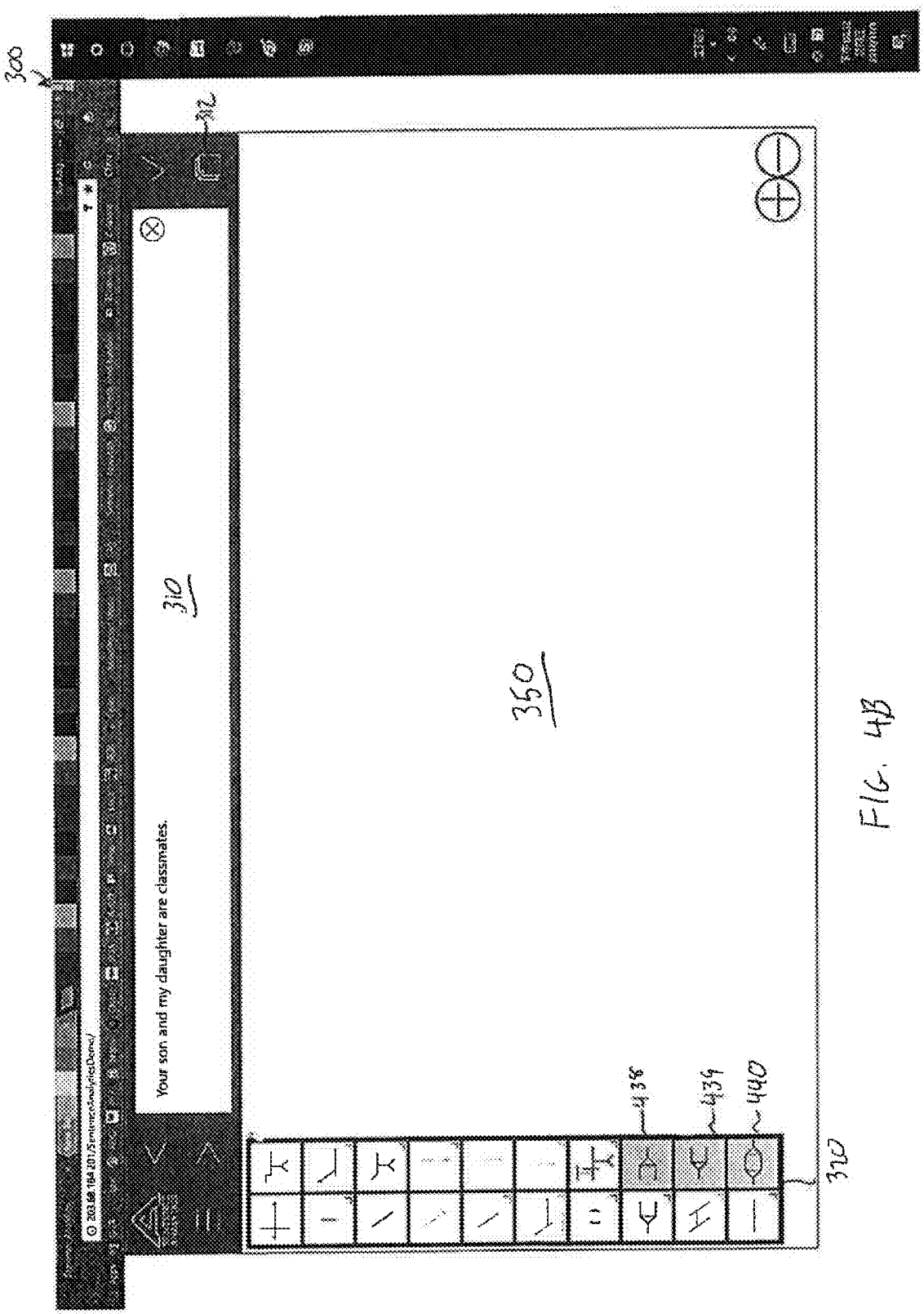

SYSTEM AND METHOD FOR IMPROVING SENTENCE DIAGRAM CONSTRUCTION AND ANALYSIS BY ENABLING A USER POSITIONING SENTENCE CONSTRUCTION COMPONENTS AND WORDS ON A DIAGRAMMING INTERFACE

CROSS-REFERENCE TO RELATED APPLICATION

This application claims the benefit of U.S. Provisional Patent Application No. 62/615,175, filed Jan. 9, 2018, hereby incorporated by reference in its entirety.

FIELD OF THE INVENTION

This application relates to the field of systems and method for facilitating diagram construction and analysis. More specifically, this application relates to a system and method for generating a constructed and thereafter populated sentence structure for comparison to an analysis sentence structure.

BACKGROUND

A sentence diagram is a pictorial representation of the grammatical structure of a sentence. The pictorial representation illustrates the relationships between words and their purpose within the diagrammed sentence. The most widely known diagramming convention, Reed-Kellogg diagrams, introduced in 1877 by Alonzo Reed and Brainerd Kellogg have been used to allow students to visualize sentences, showing you the relationships between different sentence parts. An example of a sentence diagramming schemata using the Reed-Kellogg system is described below.

A typical diagram of a simple sentence includes a horizontal line called the base. A sentence subject is positioned on a leftmost side of the base. A sentence predicate is positioned to the right of the sentence subject, separated by a first line which is a vertical bar which extends through the base. The predicate contains a verb which requires other sentence elements to complete the predicate, permits them to do so, or precludes them from doing so. The verb and its object, when present, are separated by a second line that ends at the baseline. If the object is a direct object, the second line is vertical. If the object is a predicate noun or adjective, the second line resembles a backslash, \, sloping toward the subject.

Modifiers of the subject, predicate, or object are positioned on angled lines extending below, but attached to, the base line. Modifiers, such as adjectives (including articles) and adverbs, are placed on the angled lines to be below the word they modify. Prepositional phrases are also positioned beneath the word they modify; the preposition is positioned on the slanted line and the end of the slanted line that is away from the base line includes a horizontal line on which an object of the preposition is positioned. These basic diagramming conventions have been augmented for other types of sentence structures, e.g. for coordination and subordinate clauses.

However, many linguists have moved away from these traditional diagrams based for various reasons. For example, traditional diagrams can't represent every structure, because traditional diagramming systems were incomplete, traditional diagrams don't preserve the word order of the sentence, and sentence diagrams can get very complex, even when sentences aren't terribly complex. Further, traditional software is not easily adaptable to represent the human-thought process that led to the development of the Reed-Kellogg diagram.

In addition to the changes being made to traditional diagrams, sentence diagramming has been changed by the use of software tools to facilitate sentence diagramming. These tools allow a user to use tools such as pre-assembled structures to be filled by the user which can then be manipulated by the user. Other tools allow users to change the color of the text, zoom in and out, perform additional illustrative functions, etc. These tools have been provided for personal computing devices, classroom displays such as smartboards, etc.

Additional software tools incorporate an educational aspect with the sentence diagramming functionality. These tools, for example, allow a user to chose a sentence to diagram and provides instructions to the user, provide pre-diagrammed sentences for the user to drag words into designated spots, and automatically diagram a provided sentence.

However, these software tools are not widely used based on their difficulty of use, their lack of desirable features and their difficulty to be adapt for non-traditional sentence diagramming. For example, using traditional software, an educator may be forced to spend 8-12 minutes to grade a single sentence diagram. If a test has five diagrams and a teacher has 45 students, a teacher may need to spend 45 hours to grade that single test. Existing software tools have not been adapted to facilitate this grading.

What is needed is a system and method for efficient sentence diagram construction and analysis in computer-implemented software. Further, what is needed is such a system and method configured for generating an analysis of a constructed and populated sentence structure in comparison to an analysis sentence structure.

SUMMARY OF THE INVENTION

The present invention provides a computer-implemented system for improving computerized analysis and grading for one or more populated sentence structure diagrams. The system includes a sentence diagramming interface which in turn includes a natural language input for receiving a natural language sentence to be diagrammed, a sentence construction toolbox including a plurality of sentence construction components used in generating a constructed sentence structure, and a sentence construction workspace configured to receive and allow manipulation of at least one selected sentence construction component to generate the constructed sentence structure and receive and allow manipulation of each word in the natural language sentence such that each word is assigned to a position in the constructed sentence structure to generate a constructed and populated sentence structure. The system further includes sentence analysis logic implemented on a server computer for comparing the constructed and populated sentence structure to an analysis sentence structure to assign a grading point value to the constructed and populated sentence structure.

In one more detailed aspect, the constructed sentence structure includes a plurality of sentence structure components. The sentence structure components in the sentence construction toolbox may be customized based on the natural language sentence in the natural language input. In another detailed aspect, the sentence diagramming interface is displayed in a web browser implemented on a user computer connected to the server computer over a network.

In another detailed aspect, the sentence analysis logic is configured to analyze the constructed and populated sentence structure by comparison to an analysis sentence structure. The analysis sentence structure may be dynamically generated by the sentence analysis logic based on data entered into the natural language input or the analysis sentence structure is stored in a data storage of the server computer. Alternatively, the sentence analysis logic analyzes the constructed and populated sentence structure based on grading points for at least the sentence structure components used, a relative position of the sentence structure components, a coloration of the sentence structure components, and the position of words from the natural language input within the sentence structure components.

In another embodiment of the invention, a computer-implemented method for improving computerized analysis and grading for one or more populated sentence structure diagrams is shown. The method includes the steps of implementing a sentence diagramming interface, from a server computer, over a computer network using a web browser executed by a remote computer, receiving a natural language sentence to be diagrammed through a natural language input in the sentence diagramming interface, displaying, in the sentence diagramming interface, a sentence construction toolbox including a plurality of sentence construction components used in generating a constructed sentence structure, implementing, in the sentence diagramming interface, a sentence construction workspace configured to receive and allow manipulation of at least one selected sentence construction component to generate the constructed sentence structure and receive and allow manipulation of each word in the natural language sentence such that each word is assigned to a position in the constructed sentence structure to generate a constructed and populated sentence structure, and implementing sentence analysis logic on the server computer for comparing the constructed and populated sentence structure to an analysis sentence structure to assign a grading point value to the constructed and populated sentence structure.

Other aspects of the invention, besides those discussed above, will be apparent to those of ordinary skill in the art from the description of exemplary embodiments which follows. In the description, reference is made to the accompanying drawings, which form a part hereof, and which illustrate examples of the invention.

BRIEF DESCRIPTION OF THE DRAWINGS

FIGS. 4A-4F are screenshots of the sentence diagramming user interface using a first exemplary sentence, according to an exemplary embodiment.

DETAILED DESCRIPTION OF THE INVENTION

The present disclosure provides methods and systems for implementing a sentence diagramming system for visual construction of natural language sentences into a sentence structure that facilitates both the representation and an analysis for grading of the sentence structure, thereby improving the functionality of a computing device embodying the methods and systems, and allowing representation of the sentences accurately and efficiently. The present application describes a user interface including sentence diagramming user interface providing sentence structure components configured to facilitate depiction and analysis of sentence elements. This is achieved by providing sentence structure components visually differentiating sentence elements based on positioning and coloration in a manner not traditionally used in sentence diagramming. Thereafter, a constructed and populated sentence structure using the visually differentiating sentence elements is compared to an analysis sentence structure using a method that reduces errors and processing steps to improve system functionality.

Figure 1:
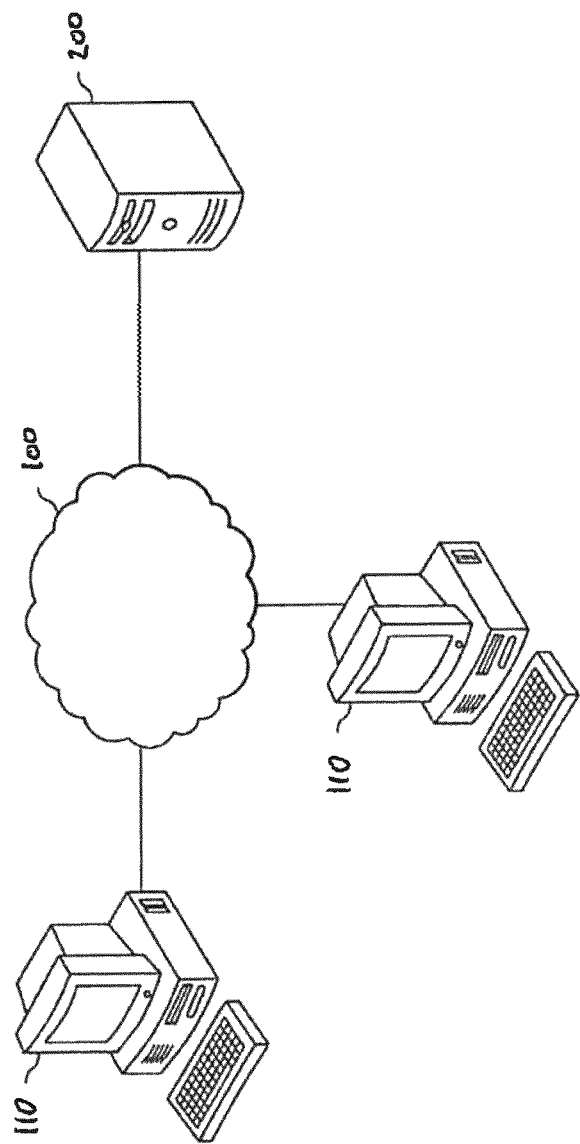
FIG. 1 is a computing network including components of a web-enabled system for providing a sentence diagramming user interface for facilitating construction of a sentence diagram of a natural language sentence, according to an exemplary embodiment.

Referring first to FIG. 1, an illustrative computing network 100 that depicts components for a web-enabled system for providing a sentence diagramming user interface for facilitating construction of a sentence diagram of a natural language sentence using a plurality of sentence structure components is shown, according to an exemplary embodiment. Computer network 100 may include a wide area network (WAN), such as the Internet, a local area network (LAN), a mobile communications network, a public service telephone network (PSTN), a personal area network (PAN), a metropolitan area network (MAN), a virtual private network (VPN), and/or another network. The computer network 100 may generally be configured to electronically connect one or more computing devices and/or components thereof. Illustrative computing devices may include, but are not limited to, at least one user computing device 110 and at least one server computing device 200.

The user computing device 110 may generally be used as an interface between a user and the other components connected to the computer network 100. Thus, the user computing device 110 may be used to perform one or more user-facing functions, such as receiving one or more inputs from a user or providing information to the user, as described in greater detail herein. In some embodiments, the user computing device 110 may contain one or more software programs and/or the like for accessing remotely implemented software programs for using a sentence diagramming user interface as described herein. Although computer network 100 is shown as including two user computing devices 110, it should be understood that any number of such computer systems may be used to interact with server computing device 200 over computer network 100.

The server computing device 200 may receive data from one or more sources (e.g., keyboard entered data, written data, etc.), process the data (e.g., convert natural language sentences into tokens), store the data, and/or provide data to one or more recipients, such as the user computing device 110.

It should be understood that while the user computing device 110 is depicting as a personal computer and the server computing device 200 is depicted as a server, these are nonlimiting examples. More specifically, in some embodiments, any type of computing device (e.g., mobile computing device, personal computer, server, etc.) may be used for any of these components. Additionally, while each of these computing devices is illustrated in FIG. 1 as a single piece of hardware, this is also merely an example. More specifically, each of the user computing device 110 and server computing device 200 may represent a plurality of computers, servers, databases, components, and/or the like.

In addition, it should be understood that while the embodiments depicted herein refer to a network of computing devices, the present disclosure is not solely limited to such a network. For example, in some embodiments, the various processes described herein may be completed by a single computing device, such as a non-networked computing device or a networked computing device that does not use the network to complete the various processes described herein.

Figure 2:
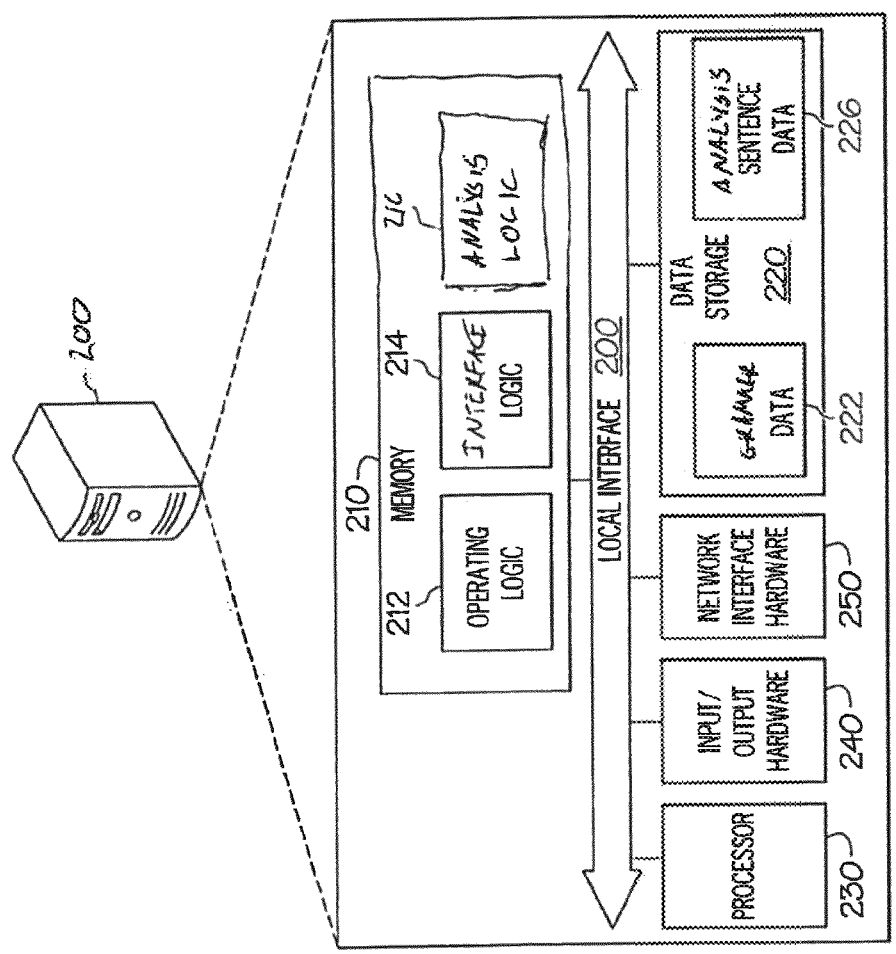
FIG. 2 is a server computing device implementing a remote a sentence diagramming user interface and for generating an analysis of a diagrammed sentence, according to an exemplary embodiment.

Referring now to FIG. 2, the server computing device 200 from FIG. 1 is shown, according to an exemplary embodiment, further illustrating a system for receiving data from one or more sources, processing the data, storing the data, and/or providing the data to one or more recipients. Particularly, the server computing device 200 may include a non-transitory computer-readable medium for providing a sentence diagramming user interface for facilitating construction of a sentence diagram of a natural language sentence using a plurality of sentence structure components and for generating an analysis of an analysis sentence structure in comparison to a constructed and populated sentence structure, according to embodiments shown and described herein. While in some embodiments the server computing device 200 may be configured as a general-purpose computer with the requisite hardware, software, and/or firmware, in some embodiments, the server computing device 200 may also be configured as a special purpose computer designed specifically for performing the functionality described herein.

The server computing device 200 may include a processing device 230, input/output hardware 240, network interface hardware 250, a data storage component 220 (which may store grammar data 222 and analysis sentence data 226), and a non-transitory memory component 210. The memory component 210 may be configured as volatile and/or nonvolatile computer readable medium and, as such, may include random access memory (including SRAM, DRAM, and/or other types of random access memory), flash memory, registers, compact discs (CD), digital versatile discs (DVD), and/or other types of storage components. Additionally, the memory component 210 may be configured to store operating logic 212 and construction interface logic 214 (each of which may be embodied as a computer program, firmware, or hardware, as an example). A local interface 200 is also included in FIG. 2 and may be implemented as a bus or other interface to facilitate communication among the components of the server computing device 200.

The processing device 230 may include any processing component configured to receive and execute instructions (such as from the data storage component 220 and/or memory component 210). The input/output hardware 240 may include a monitor, keyboard, mouse, printer, camera, microphone, speaker, touch-screen, and/or other device for receiving, sending, and/or presenting data. The network interface hardware 250 may include any wired or wireless networking hardware, such as a modem, LAN port, wireless fidelity (Wi-Fi) card, WiMax card, mobile communications hardware, and/or other hardware for communicating with other networks and/or devices.

It should be understood that the data storage component 220 may reside local to and/or remote from the server computing device 200 and may be configured to store one or more pieces of data and provide access to the one or more pieces of data. As illustrated in FIG. 2, the data storage component 220 may store grammar data 222 and constructed sentence data 224 constructed in view of the grammar data 222, as described in greater detail herein.

Included in the memory component 210 are the operating logic 212, the interface logic 214, and the sentence construction logic 216. The operating logic 212 may include an operating system and/or other software for managing components of the server computing device 200. The interface logic 214 may be configured for providing a sentence diagramming user interface for facilitating construction of a sentence diagram of a natural language sentence using a plurality of sentence structure components, as described in detail below. The sentence construction logic may be configured for constructing an analysis sentence structure if needed and for generating an analysis of an analysis sentence structure in comparison to a constructed and populated sentence structure, as also described in greater detail below.

It should be understood that the components illustrated in FIG. 2 are merely illustrative and are not intended to limit the scope of this disclosure. More specifically, while the components in FIG. 2 are illustrated as residing within the server computing device 200, this is a nonlimiting example. In some embodiments, one or more of the components may reside external to the server computing device 200. Similarly, while FIG. 2 is directed to the server computing device 200, other components such as the user computing device 110 (FIG. 1) may include similar hardware, software, and/or firmware.

It should also be understood that the components illustrated in both FIGS. 1 and 2 may be used to carry out one or more processes, such as the steps described hereinbelow.

Referring now to FIGS. 3A-3D, a sentence diagramming user interface 300 for facilitating construction of a sentence diagram of a natural language sentence using a plurality of sentence structure components is shown, according to an exemplary embodiment. Interface 300 may be displayed through a web browsing application on a user computing device 100. A user of user computing device 100 directs the web browsing address to a web address associated with server 200 to allow server 200 to display interface 200 on a display of user computing device 100.

Interface 300 includes a natural language input 310, a sentence structure component toolbox 320 and a sentence construction workspace 350. These components of interface 300 may be implemented using know graphical user interface software and be configured to display information received from server 200. According to an alternative embodiment, software for implementing user interface 300 may be stored and implemented locally on user computer system 110.

Natural language input 310 is an input space which, when selected, receives a natural language sentence entered though an input device of computer system 110. For example, the natural language sentence may be entered through a keyboard, spoken through a microphone, scanned using an optical input, etc.

Following entry of the natural language sentence, a user may select sentence entry icon 311 to initiate natural language sentence processing. Natural language sentence processing includes parsing the entered sentence such that each word is used to create one or more tokens. A single word may be used to create multiple token where the word is a contraction.

Figure 3A:
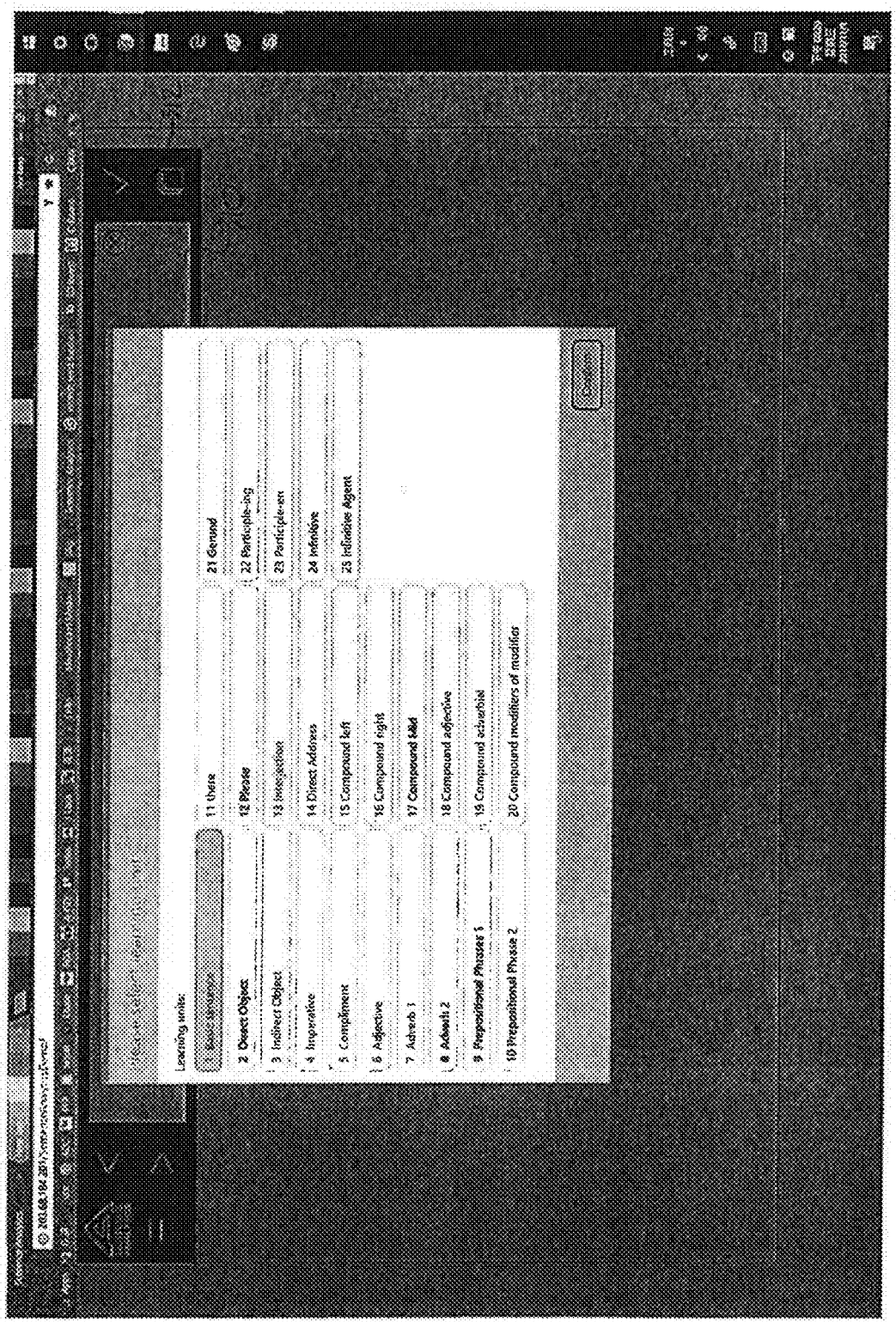
FIGS. 3A-3D are screenshots of the sentence diagramming user interface using a first exemplary sentence, according to an exemplary embodiment.

Natural language input 310 further includes a file input button 312. Following selection of button 312, interface logic 214 may be configured to display a listing of sentence diagramming learning units and receive a selection from the user. Referring now to FIG. 3A, interface 300 depicting a listing of learning unit, in which a user has selected the "Basic sentence" learning unit, is shown.

Figure 3B:
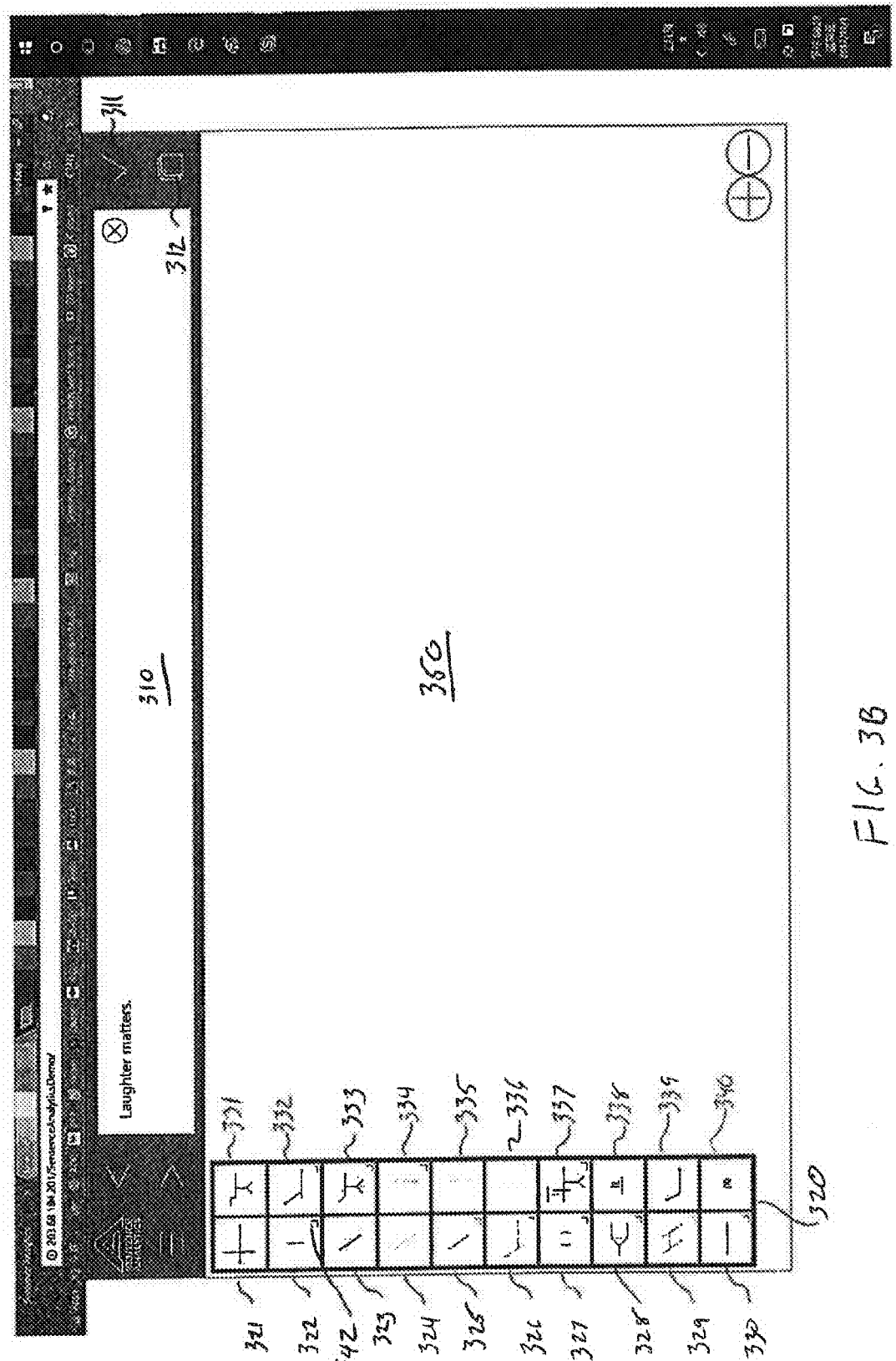

Referring now to FIG. 3B, based on the selection from the learning unit listing, the sentence "Laughter matters." is automatically populated in the natural language input 310. Sentence structure component toolbox 320 is a graphical listing of the sentence structure components that can be selected by a user of interface 300. Toolbox 320 includes a subject/predicate sentence base component 321, an object component 322, a verb/predicate noun component 323, an adjective slant line component 324, an adverb slant line component 325, a participle component 326, an appositive component 327, a compound right component 328, a compound adjective component 329, a expletive component 330, a gerund component 331, a participle component 332, an infinitive phrase component 333, a compound sentence component 334, a compound sentence conjunction component 335, an adverb clause component 336, a noun clause conjunction component 337, a cleft sentence component 338, an indirect object component 339 and an elliptical component 340.

Although toolbox 320 is shown as including an exemplary set of sentence structure components, one of ordinary skill in the art would understand that additional structure components may be provided. According to an exemplary embodiment, dependent on the learning unit that is selected, the toolbox 320 may be implemented such that only relevant sentence structure components are displayed, selectable, etc. Additionally, as shown in FIG. 3B, toolbox 320 components may be implemented as drop down menus. For example, object component 322 is provided with a drop-down selection icon 342 where selection of icon 342 will allow the user to select between different types of object components such as a direct object component, a direct object passive component, and an indirect object component.

Figure 3C:
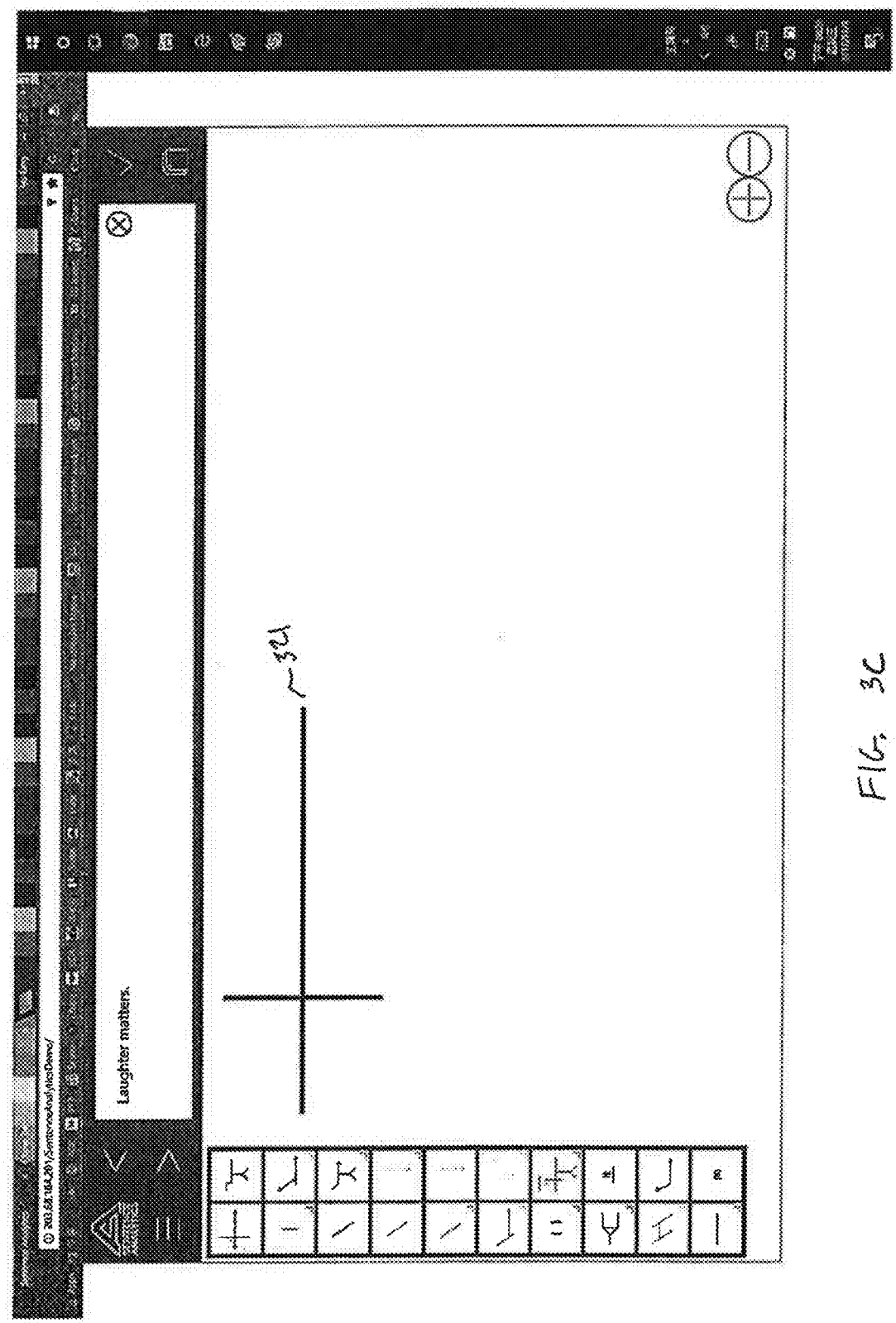

Sentence construction workspace 350 is an initially blank space in interface 300 configured to allow a user to place and manipulate one or more sentence structure components, selected from toolbox 320 to generate a constructed sentence structure. Referring now specifically to FIG. 3C, following entry of the natural language sentence in natural language input, a user selects a sentence structure component, typically the subject/predicate base component 321 as shown in FIG. 3C. Following selection, the user can drag the sentence component to any position within the workspace 350 as needed.

Figure 3D:
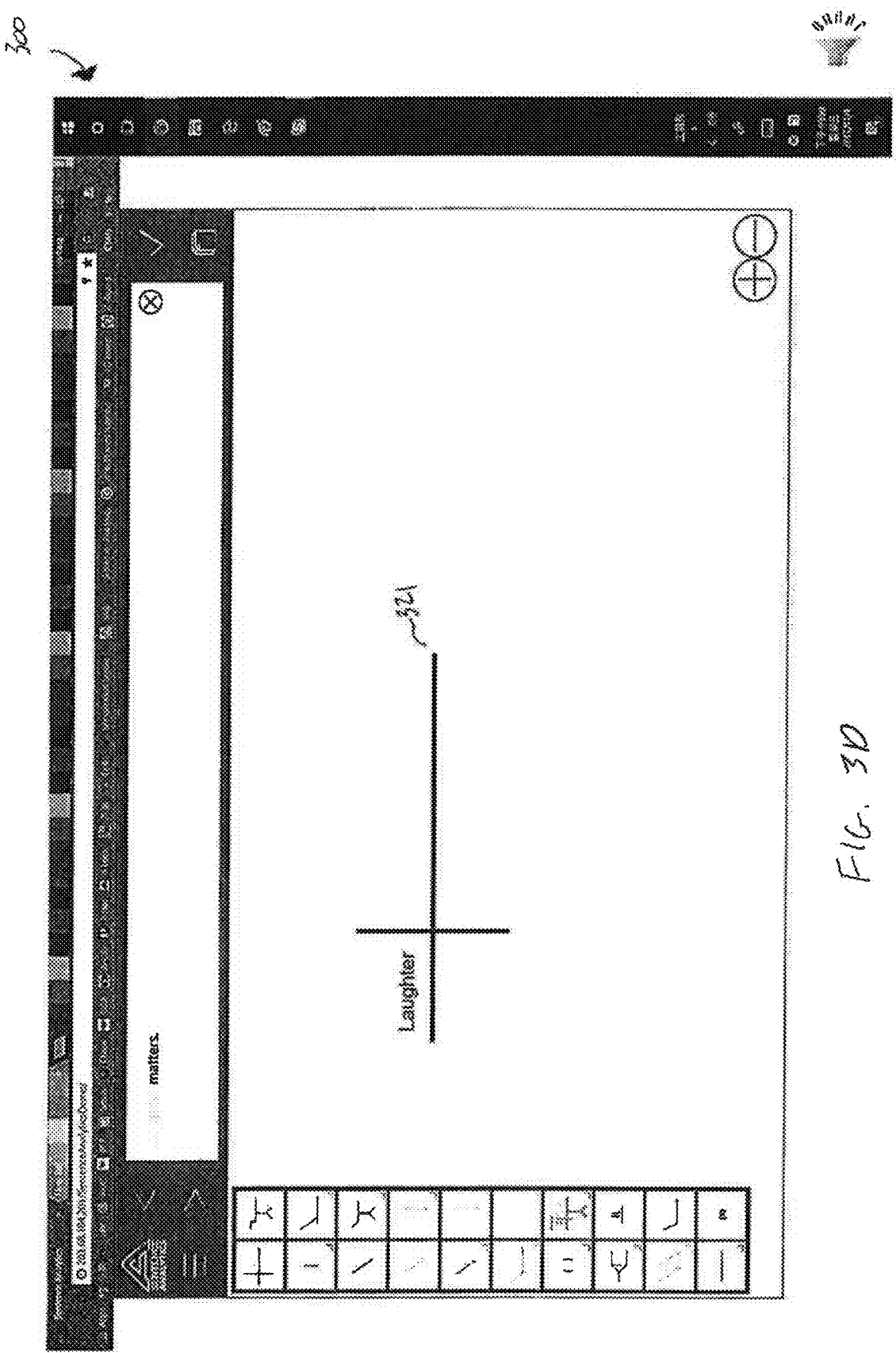

Referring now to FIG. 3D, and following the selection of one or more sentence components, the user can begin to populate the constructed sentence structure, the subject/predicate component 321 in the example shown. To populate the constructed sentence structure, creating a constructed and populated sentence structure, the user selects a word in the natural language sentence displayed in natural language input 310. Upon selection, the selected word, "Laughter" in the example shown, appears in the workspace 350. Interface 300 allows the user to drag the selected word into a word position on the constructed sentence structure. Interface 300 may be configured to modify the sentence component to correlate in size to the selected word. In the specific example shown, the size of the base line on the subject side of the subject/predicate component 321 is correlated to the size of the selected word, "Laughter". The steps shown in FIG. 3D is repeated for each word until all of the words in the natural language sentence are placed in a position on the constructed and populated sentence structure.

In an exemplary embodiment, interface logic 214 may be configured to allow a user to select a positioning guidance option. Guided learning may be turned off, provided automatically, provided based on detection of an error in component selection or word positioning, etc. Guided learning may also be provided at different levels. For example, using the positioning guidance option, interface 214 may only allow a word to be positioned in a possible position. For example, referring to the subject/predicate component 321, a noun, such as the word "Laugher" can only be positioned in the subject position. One of ordinary skill in the art would recognize that, in more complicated sentences, a selected noun may be positioned in multiple positions as, for example, a subject, a direct object, and an indirect object. Accordingly, a word may still be positioned in a possible position that is not a correct position. Additional guidance may include, but is not limited to, identifying a part of speech for a word in a sentence when the cursor is positioned over the word, providing visual feedback, such as highlighting, blinking, etc. when the cursor is positioned over the word, rejecting a positioning of a word that is incorrect by repositioning the word back in the text box, blinking the word, etc. Advantageously, allowing positioning that reduces the number of potential positions provides guided learning for the particular selected learning unit and its sentence structure(s).

Figure 4A:
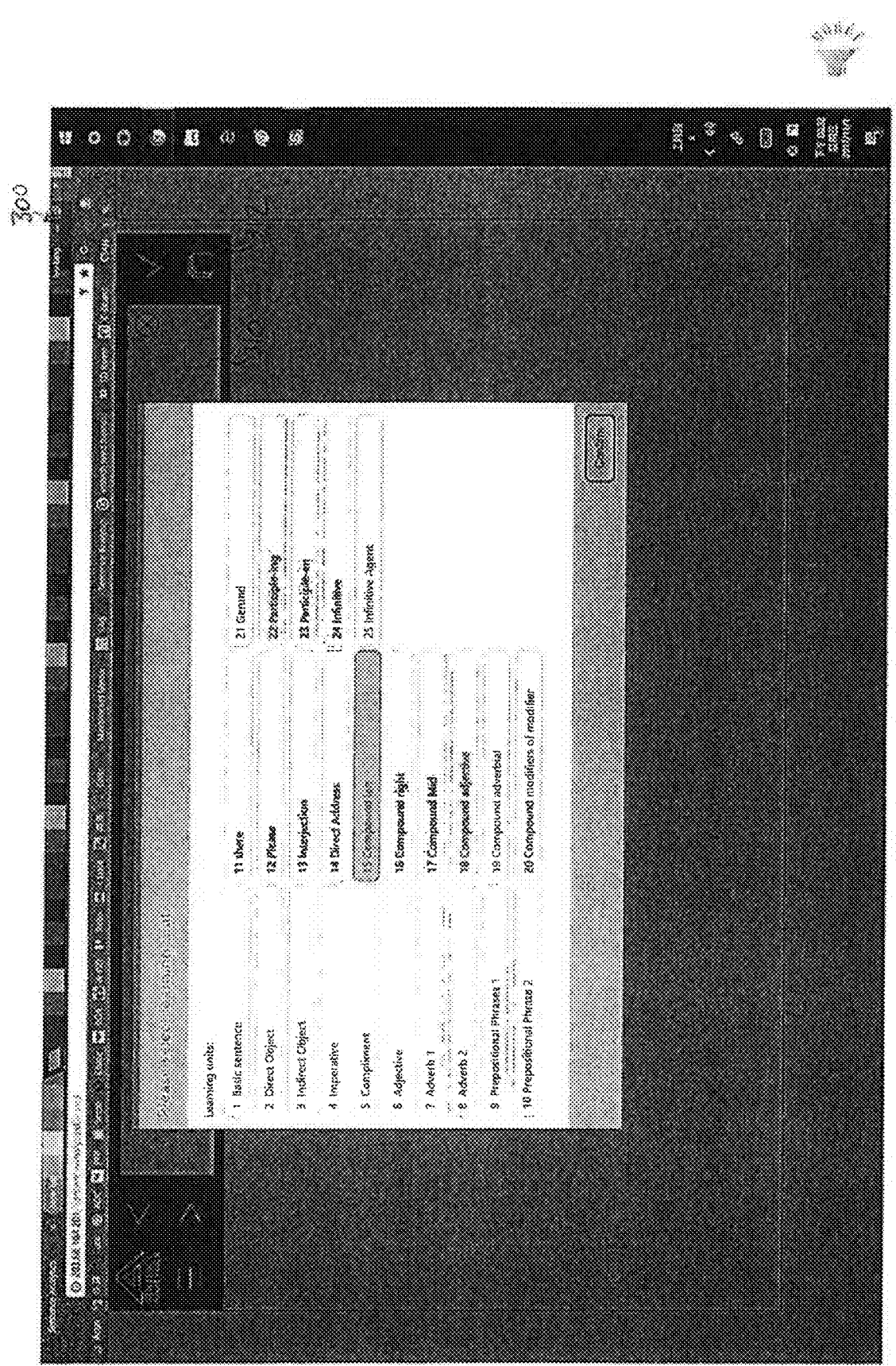

Referring now to FIGS. 4A-4F, the sentence diagramming user interface 300 is shown following selection of button 312 to display a listing of sentence diagramming learning units and receive a selection from the user. Referring now to FIG. 4A, interface 300 depicting a listing of learning units, in which a user has selected the "Compound Left" learning unit, is shown.

Referring now to FIG. 4B, based on the selection from the learning unit listing, the natural language sentence "Your son and my daughter are classmates." is automatically populated in the natural language input 310. Further, the toolbox 320 is modified based on the selection of the learning unit. Specifically, the sentence components are modified based on the selection such that the compound sentence component 334 drop down menu has been selected allowing the user to select between a compound left component 438, a compound right component 439 and a compound middle component 440.

Figure 4C:
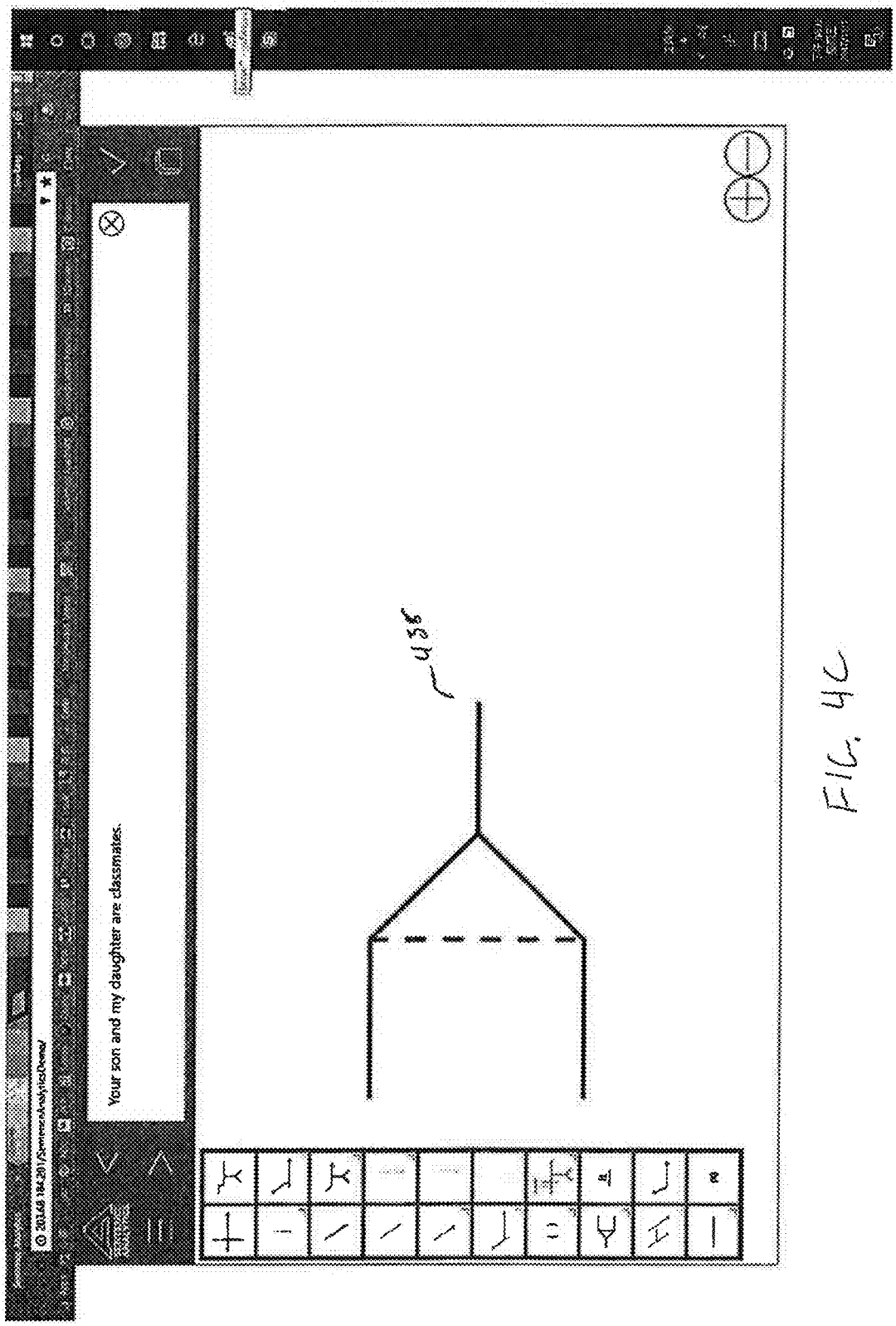

Referring now specifically to FIG. 4C, following entry of the natural language sentence in natural language input, a user selects a sentence structure component, in this case the compound left component 438. Following selection, the user can drag the sentence component to any position within the workspace 350 as needed. However, as the sentence displayed in the natural language input is more complicated than the example provided above with reference to FIGS. 3A-3D, additional sentence structure components are needed.

Figure 4D:
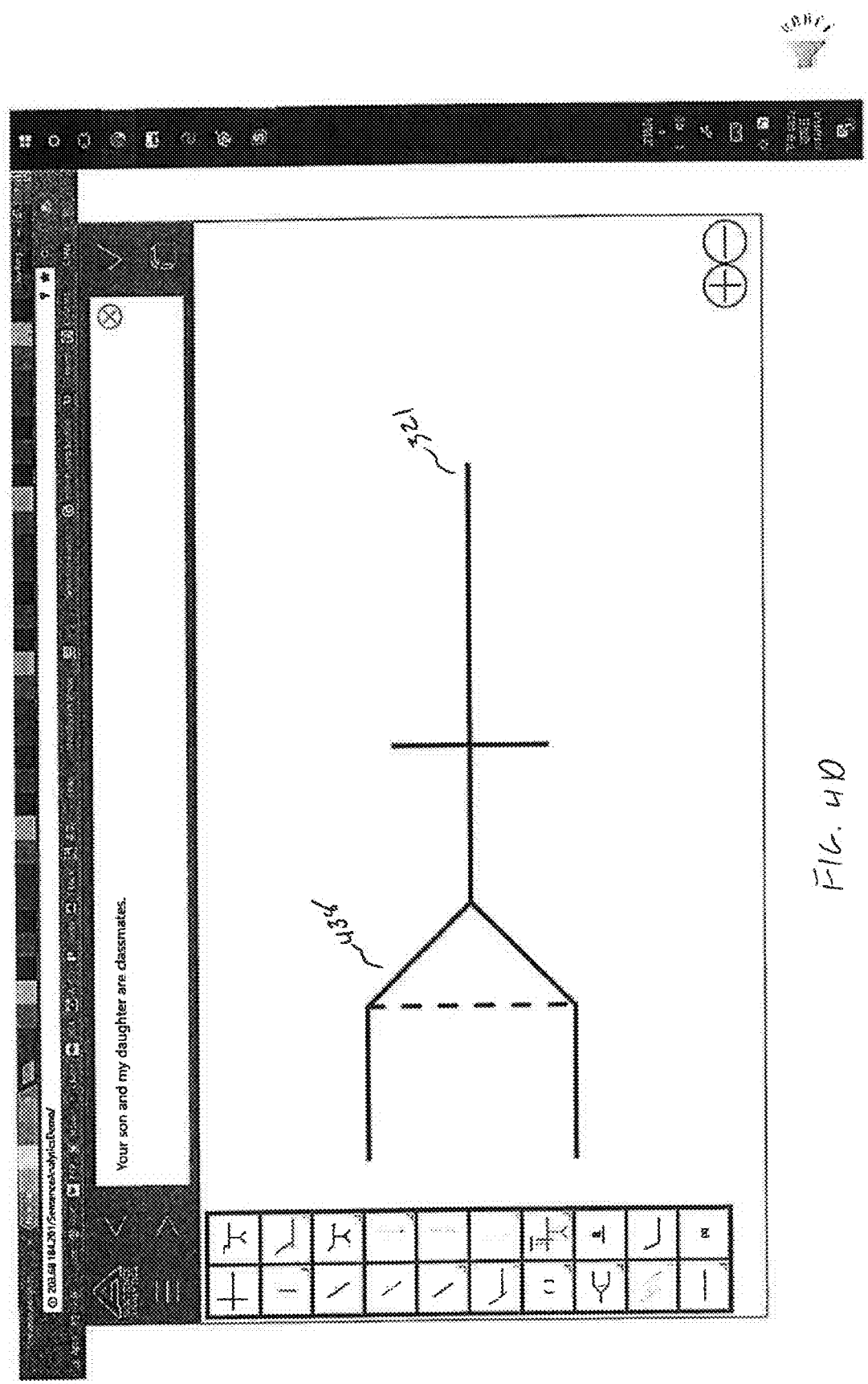
Figure 4E:
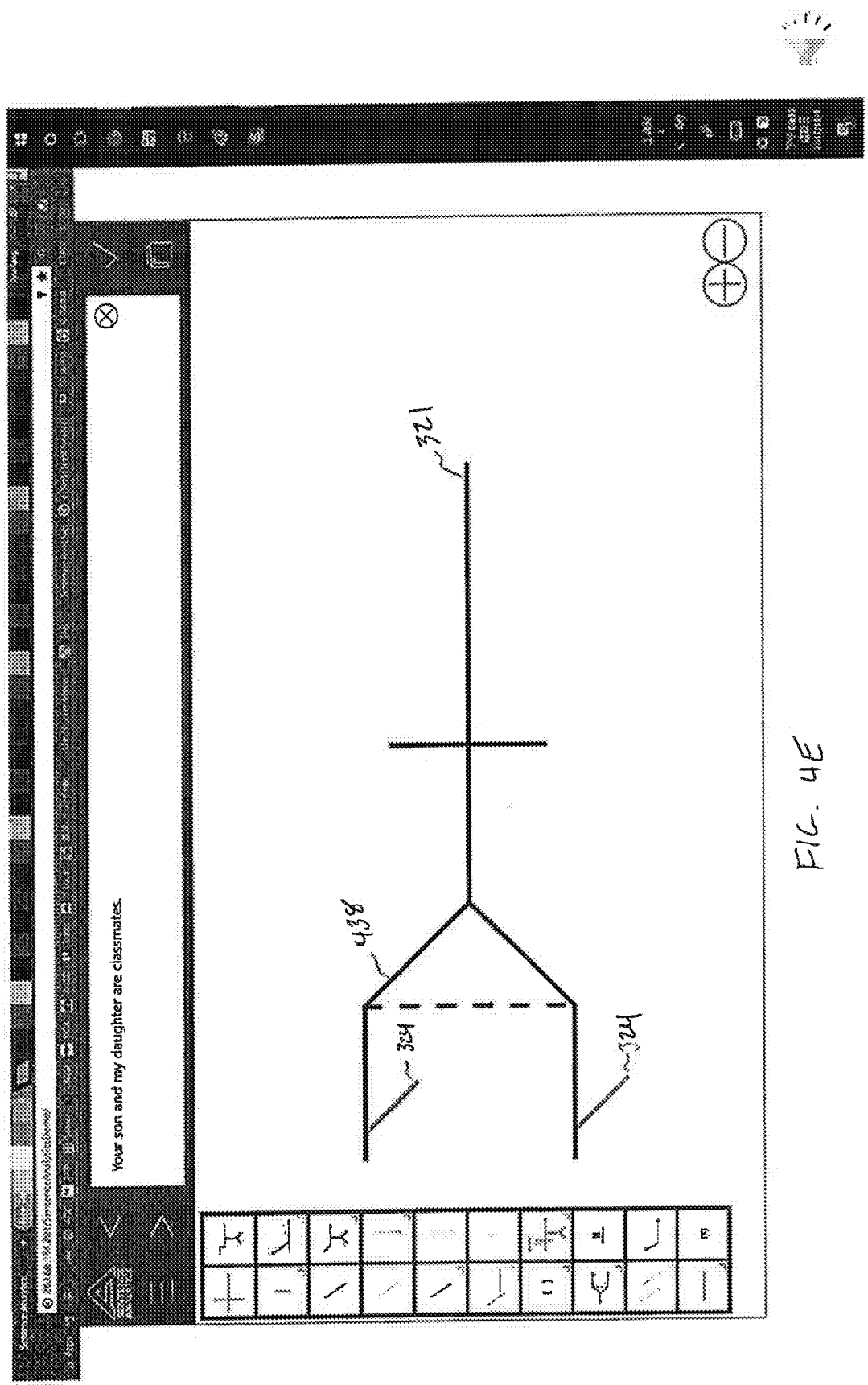

Accordingly, as shown in FIG. 4D, subject/predicate base component 321 is added to the compound left component 438 in the workspace 350. Interface logic 214 may be to implement a "snap to" functionality within the workspace 350 such that component 321 is positioned in a position adjacent to component 421 at an appropriate juncture. When a grammar-specific component, whether a horizontal, vertical or slanted line, or a pre-assembled set, is dragged near a "possible or correct target area" near a sentence base line, interface logic 214 automatically pulls and connects the dragged component to the sentence base line. For example, as seen in FIG. 4E, the constructed sentence structure has been further developed by the addition of two an adjective slant line component 324.

Figure 4F:
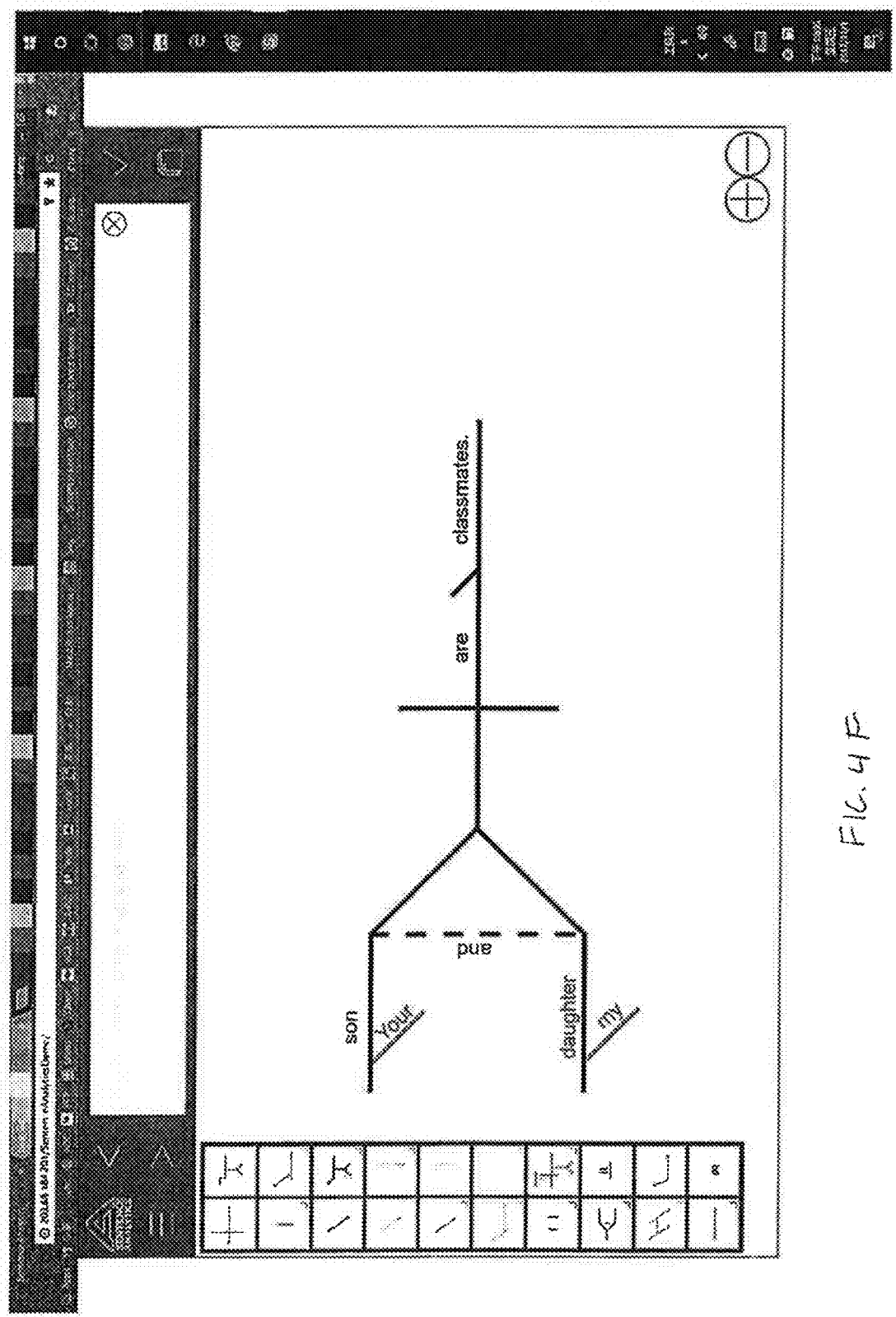

Referring now to FIG. 4F, following construction of the constructed sentence structure using the sentence components, the user can begin to populate the constructed sentence structure, similar to as described above with reference to FIG. 3D. To populate the constructed sentence structure, the user selects a word in the natural language sentence displayed in natural language input 310. Upon selection, the selected word appears in the workspace 350. Interface 300 allows the user to drag the selected word into a word position on the constructed sentence structure.

In an exemplary embodiment, interface 300 may be configured to allow a user to rotate a word that is positioned in workspace 350. Alternatively, interface logic 214 may be configured to automatically rotate a positioned word based on the type of word as indicated in the grammar data 222. According to yet another alternative, interface logic 214 may be configured to automatically reorient the positioned word based on the location of the constructed sentence structure over which the positioned word is dragged. For example, the positioned word may be automatically slanted when dragged over an adjective slant line component 324, oriented horizontally when dragged over either position of the subject/predicate base component 321, and oriented vertically when dragged over the dashed line position of the compound left component 438.

Referring now to FIGS. 5A-5F, an exemplary embodiment of analysis sentence structure 500 and analysis sentence sub-structures 510-550 for generating an analysis of an analysis sentence structure in comparison to a constructed and populated sentence structure, according to embodiments shown and described herein. In addition to the functionality associated with interface 300 for generating and populating a constructed sentence structure, server 200 is configured to perform a constructed and populated sentence structure analysis comparing the constructed and populated sentence structure to one or more analysis sentence structure(s) to determine a sentence structure construction accuracy for, for example, learning and grading purposes.

The analysis sentence structure 500 may be associated with each learning unit shown in FIGS. 3A and 4A above. These structures 500 may be provided by educators or publishers and stored in data storage 220 in analysis sentence data 226. Alternatively, where natural text is entered into natural language input 310, analysis logic 216 may be configured to utilize the grammar data 222 in data storage 220 to generate an analysis sentence structure 500 for the entered natural language sentence.

Analysis sentence structure 500 depicts a sentence diagram for the sentence "The people who are crazy enough to think they can change the world are the ones who do." Analysis logic 216 is configured to parse the natural language sentence to determine a grading point amount to be associated with the structure 500. Although there only 18 words in the sentence, structure 500 may have a widely varying number of grading points that can be associated. The grading points to be associated with the structure 500 may be dependent on the particular aspects focused on by an educator.

To calculate the grading points to be associated with structure 500, analysis logic 216 initially determines the number of sentence sub-structures in the sentence. Structure 500, as shown in FIG. 5, includes five sentence sub-structures 510-550. Grading points are calculated within each sentence substructure and also via examining the relationship among the sentence substructures.

Figure 5A:
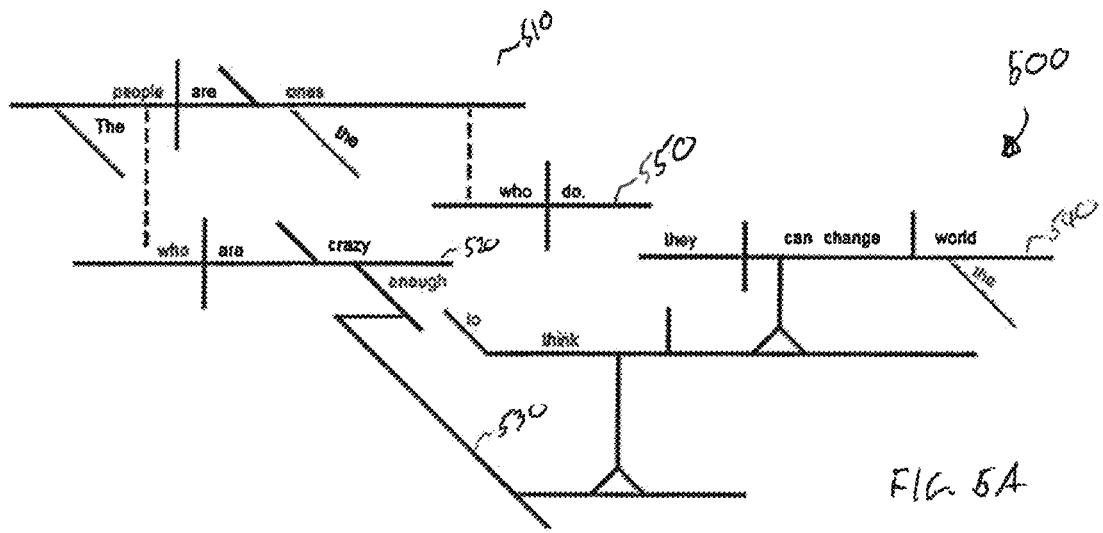
FIGS. 5A-5F are diagrams of an analysis sentence structure and its sentence sub-structures, according to an exemplary embodiment.
Figure 5B:
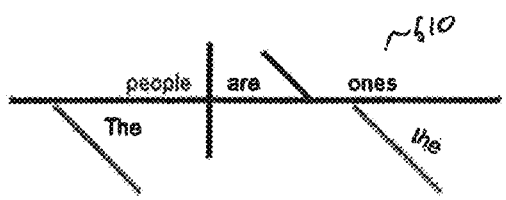

Referring now to FIG. 5B, sentence substructure 510, for the phrase "The people are the one", includes a main clause sentence baseline (1 point), the positions of the five words populating the sentence substructure (5 points), the complement slant line (1 point), the two slant lines of the two articles (2 points), and the color of the two adjective lines (2 points) for a total of 11 points associated with the sentence substructure. Analysis logic 216 may be configured to assign weights to particular types of sentence components, particular words, particular coloration of sentence components, etc. for example, the complement slant line in substructure 510 may be assigned a double weighting based on the importance of that line, as determined by an educator or publisher, within the sentence substructure. Accordingly, with weighting, since substructure 510 may provide 12 grading points in this example.

Figure 5C:
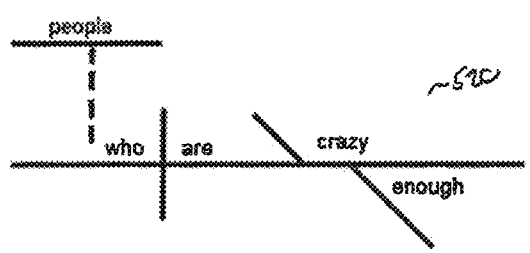

Referring now to FIG. 5C, sentence substructure 520, for the phrase "(people) who are crazy enough", includes a sentence baseline (1 point), the positions of the four words populating the sentence substructure (4 points), the complement slant line (1 point), the slant line of the adverb "enough" (1 point), the color of the adverb slant line (1 point), the dashed line (1 point), the color of the adjective clause (1 point), and the positions of the two ends of the dashed line (2 points). For a total of 12 points associated with the sentence substructure for this example, the complement slant line and the color of the adjective clause in substructure 520 may be assigned a double weighting. Accordingly, with weighting, sentence substructure 520 may provide 14 grading points in this example.

Figure 5D:
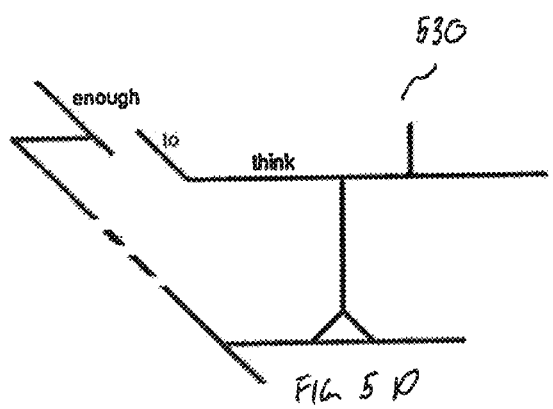

Referring now to FIG. 5D, sentence substructure 530, for the phrase "(enough) to think", includes am infinitive baseline (I point), the positions of the two words populating the sentence substructure (2 points), the objective slant line (1 point), the ocher line and the prepositional phrase line of the adverb connecting "enough" (2 points), and the color of the adverbial prepositional phrase (1 point) for a total of 7 points associated with the sentence substructure. For this example, the objective slant line in substructure 530 may be assigned a double weighting. Accordingly, with weighting, sentence substructure 530 may provide 8 grading points in this example.

Figure 5E:
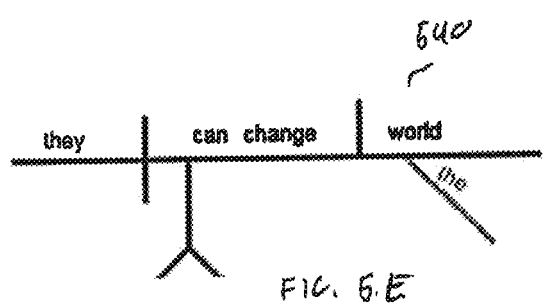

Referring now to FIG. 5E, sentence substructure 540, for the phrase "they can change the world", includes a noun clause baseline (1 point), the positions of the five words populating the sentence substructure (5 points), the object vertical line (1 point), the slant lines of the article (1 point), the color of the adjective slant line (1 point), the dashed line (1 point), the color of the adjective clause (1 point), and a position of the whole set (1 point) for 10 points. For this example, the noun clause baseline, object vertical line and the position of the whole set in substructure 540 may be assigned a double weighting. Accordingly, with weighting, sentence substructure 540 may provide 13 grading points in this example.

Figure 5F:
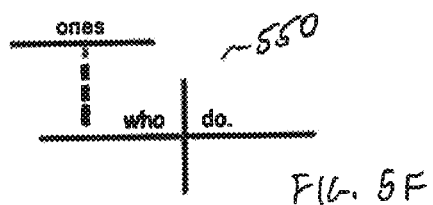

Referring now to FIG. 5F, sentence substructure 550, for the phrase "(ones) who do", includes a sentence baseline (1 point), the positions of the two words populating the sentence substructure (2 points), the dashed line (I point), an adjective clause signal (1 point) and the positions of the two ends of the dashed line (2 points), and a position of the whole set (I point) for 7 points. For this example, the adjective clause signal and the positions of the two ends of the dashed line in substructure 540 may be assigned a double weighting. Accordingly, with weighting, sentence substructure 540 may provide 10 grading points in this example.

Accordingly, the total score for successfully analyzing the sentence is 57 points. For an experienced greater, grading this diagram, including adding up all of the individual points, would typically take about 8 to 12 minutes. Since a common homework assignment or tests includes at least five sentences, experience greater may be required to take an hour to create just one homework assignment or test.

In operation, analysis logic 216 is configured to identify the location of tokens generated from a sentence entered into input space 310. The identified token location may be compared to an assigned token location within a selected sentence structure component in the workspace 350. In one embodiment, analysis logic 216 compares the assigned token location within the selected sentence structure component to an answer key assigned token location within the selected sentence structure component. Points can then be awarded if the workspace 350 combination matches the answer key combination.

The answer key may be manually generated by a teacher using the workspace 350 in the same manner as described above with reference to FIGS. 3 and 4. Alternatively, the answer key may be automatically generated by analysis logic 216 using grammar data 222.

This has been a description of exemplary embodiments, but it will be apparent to those of ordinary skill in the art that variations may be made in the details of these specific embodiments without departing from the scope and spirit of the present invention, and that such variations are intended to be encompassed by the following claims.

I claim:

1. A computer-implemented system for improving computerized analysis and grading for one or more populated sentence structure diagrams, comprising:
    a sentence diagramming user interface including
        a natural language input for receiving a natural language sentence to be diagrammed,
        a sentence construction toolbox including a plurality of sentence construction components used in generating a constructed sentence structure, and
        a sentence construction workspace configured to
            receive a user selected sentence construction component from the sentence construction toolbox and receive user positioning of the user selected sentence construction component within the sentence construction workspace relative to at least one previously selected sentence construction component to generate the constructed sentence structure and
            receive a user selection of a word from the natural language sentence and receive user positioning the user selected word for each word in the natural language sentence such that each word is assigned to a position in the constructed sentence structure to generate a constructed and populated sentence structure; and
    sentence analysis logic implemented on a server computer for comparing the constructed and populated sentence structure to an analysis sentence structure to assign a grading point value to the constructed and populated sentence structure.

2. The computer-implemented system of claim 1, wherein the sentence analysis logic is configured to analyze the constructed and populated sentence structure by comparison to an analysis sentence structure.

3. The computer-implemented system of claim 2, wherein the analysis sentence structure is dynamically generated by the sentence analysis logic based on data entered into the natural language input.

4. The computer-implemented system of claim 2, wherein the analysis sentence structure is stored in a data storage of the server computer.

5. The computer-implemented system of claim 2, wherein the sentence analysis logic analyzes the constructed and populated sentence structure based on grading points for at least the sentence structure components used, a relative position of the sentence structure components, a coloration of the sentence structure components, and the position of words from the natural language input within the sentence structure components.

6. The computer-implemented system of claim 1, wherein the constructed sentence structure includes a plurality of sentence structure components.

7. The computer-implemented system of claim 1, wherein the sentence structure components in the sentence construction toolbox are customized based on the natural language sentence in the natural language input.

8. The computer-implemented system of claim 1, wherein the sentence diagramming interface is displayed in a web browser implemented on a user computer connected to the server computer over a network.

9. A computer-implemented method for improving computerized analysis and grading for one or more populated sentence structure diagrams, comprising:
    implementing a sentence diagramming user interface, from a server computer, over a computer network using a web browser executed by a remote computer;
    receiving a natural language sentence to be diagrammed through a natural language input in the sentence diagramming interface;
    displaying, in the sentence diagramming interface, a sentence construction toolbox including a plurality of sentence construction components used in generating a constructed sentence structure;
    implementing, in the sentence diagramming interface, a sentence construction workspace configured to
        receive a user selected sentence construction component from the sentence construction toolbox and receive user positioning of the user selected sentence construction component within the sentence construction workspace relative to at least one previously selected sentence construction component to generate the constructed sentence structure and
        receive a user selection of a word from the natural language sentence and receive user positioning the user selected word for each word in the natural language sentence such that each word is assigned to a position in the constructed sentence structure to generate a constructed and populated sentence structure; and
    implementing sentence analysis logic on the server computer for comparing the constructed and populated sentence structure to an analysis sentence structure to assign a grading point value to the constructed and populated sentence structure.

10. The computer-implemented method of claim 9, wherein the sentence analysis logic is configured to analyze the constructed and populated sentence structure by comparison to an analysis sentence structure.

11. The computer-implemented method of claim 10, wherein the analysis sentence structure is dynamically generated by the sentence analysis logic based on data entered into the natural language input.

12. The computer-implemented method of claim 10, wherein the analysis sentence structure is stored in a data storage of the server computer.

13. The computer-implemented method of claim 10, wherein the sentence analysis logic analyzes the constructed and populated sentence structure based on grading points for at least the sentence structure components used, a relative position of the sentence structure components, a coloration of the sentence structure components, and the position of words from the natural language input within the sentence structure components.

14. The computer-implemented method of claim 9, wherein the constructed sentence structure includes a plurality of sentence structure components.

15. The computer-implemented method of claim 9, wherein the sentence structure components in the sentence construction toolbox are customized based on the natural language sentence in the natural language input.

* * * * *